United States Patent [19]

Warren

[11] Patent Number: 4,552,466
[45] Date of Patent: Nov. 12, 1985

[54] COMPLIANT HYDRODYNAMIC FLUID JOURNAL BEARING

[75] Inventor: Edward L. Warren, North Olmsted, Ohio

[73] Assignee: The United States of America as represented by the Administrator of the National Aeronautics and Space Administration, Washington, D.C.

[21] Appl. No.: 603,374

[22] Filed: Apr. 24, 1984

[51] Int. Cl.⁴ ............................................. F16C 32/06
[52] U.S. Cl. ..................... 384/103; 384/106
[58] Field of Search ................. 384/99, 100, 103, 104, 384/105, 106

[56] References Cited

U.S. PATENT DOCUMENTS

| | | | |
|---|---|---|---|
| 3,366,427 | 1/1968 | Silver et al. | 384/103 |
| 3,795,427 | 3/1974 | Licht et al. | 384/103 |
| 3,809,443 | 5/1974 | Cherubim | 384/106 |
| 4,113,585 | 1/1979 | Licht | 308/9 |
| 4,178,046 | 12/1979 | Silver et al. | 384/103 |
| 4,223,958 | 9/1980 | Gray | 308/9 |
| 4,229,054 | 10/1980 | Miller, Jr. | 308/9 |
| 4,262,975 | 4/1981 | Hesmat et al. | 308/9 |
| 4,277,113 | 7/1981 | Heshmat | 308/9 |
| 4,415,281 | 11/1983 | Agrawal | 384/106 X |

FOREIGN PATENT DOCUMENTS

| | | | |
|---|---|---|---|
| 684190 | 9/1974 | U.S.S.R. | 384/103 |
| 756099 | 8/1980 | U.S.S.R. | 384/103 |

Primary Examiner—Donald Watkins
Assistant Examiner—Thomas R. Hannon
Attorney, Agent, or Firm—Gene E. Shook; John R. Manning

[57] ABSTRACT

A novel air bearing structure prevents destructive bending moments within the top foil. Welds are eliminated by mounting the top bearing foil in the bearing cartridge sleeve without using a spacer block.

Tabs or pins at the end of the top bearing foil are restrained by slots or stops formed in the cartridge sleeve. These structural members are free to move in a direction normal to the shaft while being restrained from movement in the direction of shaft rotation.

8 Claims, 5 Drawing Figures

COMPLIANT HYDRODYNAMIC FLUID JOURNAL BEARING

ORIGIN OF THE INVENTION

The invention described herein was made by an employee of the U.S. Government and may be manufactured and used by or for the Government for governmental purposes without the payment of any royalties thereon or therefor.

TECHNICAL FIELD

This invention is directed to compliant hydrodynamic fluid journal bearings. The improved structure is particularly concerned with preventing the occurrence of destructive bending moments within the foil of an air bearing.

The hostile environment of a gas turbine engine creates difficulty in lubricating and cooling oil bearings. Air bearings simplify the design of lightly loaded, high speed shafts operating in hostile environments similar to those found in the turbine section of a gas turbine engine.

Air bearings have been used on the high speed, lightly loaded gas generator shafts of certain turbine engines. These air bearings are of the compliant foil type which are known in the prior art.

Air bearing failures have been a continuing problem in these gas turbine engines. The solution of the air bearing failure problem is of primary importance if the reliability of gas turbine engines is to be improved. Studies of the failures of air bearings indicate a failure at a row of spot welds joining the foil to the bump block. A fracture has been found which follows a wavy line along the centerline of each of these welds.

It is, therefore, an object of the present invention to reduce air bearing failures. The invention is particulary directed to providing an air bearing which does not require a bump block. This eliminates the problems created by welds used to join the bearing top foil to such a bump block.

PRIOR ART

Miller, Jr. U.S. Pat. No. 4,229,054 describes a multipad compliant foil air bearing which utilizes conventional spacer blocks. A tab on the top bearing foil of each of the bearing modules is positioned in a recess in the center of the spacer block associated with an adjacent bearing module.

Heshmat et al U.S. Pat. No. 4,262,975 is directed to a compliant journal bearing having three pads for supporting a rotating shaft in a journal sleeve. Each pad has a flexible bearing sheet attached to the sleeve along one edge and a resilient supporting structure attached to the sleeve under the bearing sheet for compliantly supporting the bearing sheet to support the shaft.

Heshmat U.S. Pat. No. 4,277,113 is concerned with a compliant fluid film bearing having a thin flexible bearing sheet supported on a resilient bump-form support member which is divided into multiple adjacent strips. In both of these patents the bearing sheet is welded to the top surface of the spacer block at the leading edge of the bearing sheet. The spacer block is, in turn, welded along its bottom face to the thrust plate at the leading edge of the pad.

These patents illustrate conventional compliant foil air bearings which utilize an inner foil bearing surface spaced away from a cartridge sleeve by a corrugated bump foil. A spacer block is used to space the end of the inner foil bearing surface away from the cartridge sleeve and the corrugated bump foil. The top foil is generally welded to the spacer block. However, due to bending moments created within the foil, fatigue can occur near the weld which will result in bearing failure.

DISCLOSURE OF THE INVENTION

The reliability of complaint foil bearings is improved by preventing the occurrence of destructive bending moments within the foil of the bearing. In the bearing of the present invention the top bearing foil is mounted in the cartridge sleeve without the use of a spacer block.

Tabs at the end of the top bearing foil are received in suitable slots in the cartridge sleeve. Also, outwardly extending tabs on the end of the top bearing foil may be extended beyond the bearing and simply restrained by stops attached to the cartridge sleeve outside the bearing.

Alternately, the end of the foil may be extended beyond the bearing and bent to be restrained by extensions of the bearing sleeve. The end of the top foil may also be formed as an eye through which a restraining pin may be placed. In this embodiment the pin is free to move up and down in relation to the cartridge sleeve.

BRIEF DESCRIPTION OF THE DRAWINGS

The advantages and novel features of the invention will be more fully apparent from the following detailed description when read in connection with the accompanying drawings wherein like numerals are used throughout to identify like parts.

BEST MODE FOR CARRYING OUT THE INVENTION

Figure 1:
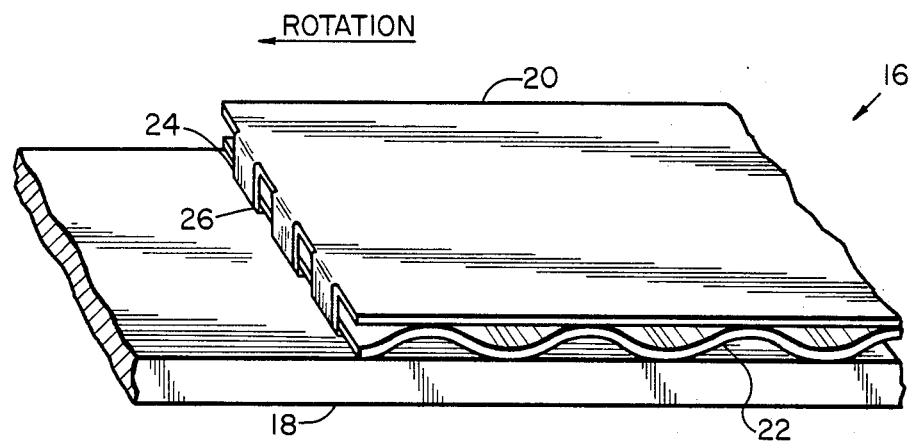
FIG. 1 is a perspective view of an unwrapped air bearing module or pad assembly constructed in accordance with the present invention.
Figure 2:
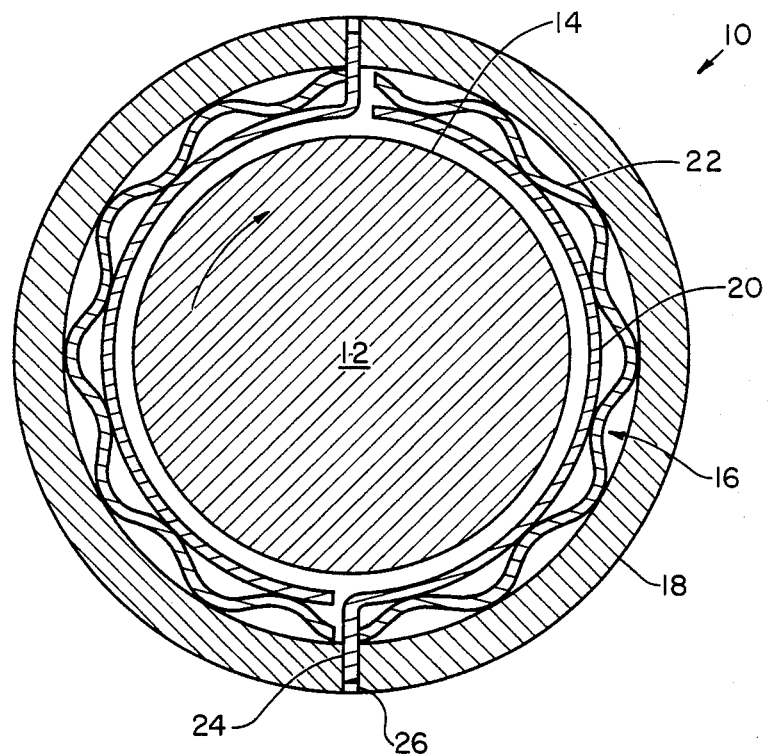
FIG. 2 is a vertical cross section view of the bearing pad assemblies of the type shown in FIG. 1 assembled in an air bearing cartridge.

Referring now to FIGS. 1 and 2 there is shown an improved compliant foil air bearing cartridge 10 for supporting a rotating shaft 12. The shaft has a bearing surface 14, and it rotates in a clockwise direction as indicated by the arrow in FIG. 2. A pair of bearing modules or pad assemblies 16 are mounted in a stationary retainer or mounting member in the form of a cartridge sleeve 18 to support the radial load of the shaft 12. The cartridge sleeve 18 has a cylindrical bore extending therethrough for receiving the shaft 12. The bore of the sleeve 18 is coaxial with the shaft 12.

Each bearing module or pad assembly 16 comprises a top foil member 20 supported by a suitable compliant element in the form of a bump foil 22. An alloy known commerically as Inconel X-750 having a thickness of about 0.004 inch has been satisfactory for the bump foil. A suitable curved die is used to form a plurality of resilient semicircular projections or bumps in the foil so that it has a generally corrugated configuration as shown in both FIGS. 1 and 2. The bumps are formed in the material in the annealed condition. For use with a shaft 12 having a diameter of about 38 MM, each bump should have a height of about 0.50 MM, a pitch of about 4.6 MM, and a length of about 3.6 MM.

After forming, the bump foil is cleaned, preferably with alcohol. The formed sheet is mounted in a heat-treatment mandrel fixture after the bump foil has been cleaned. The bump foil 22 is then heat treated for about 20 hours at a temperature of 1300° F. in a nitrogen environment.

The top foil 20 is preferably of an alloy material known commerically as Inconel X-750 or Inconel 718 having a thickness of about 0.004 inch. The foil is cut to size in the annealed condition. The top foil 20 is then rolled after cutting.

According to the present invention, a plurality of projections or tabs 24 are formed at the end of the foil 20 in the direction of rolling. These tabs are bent at right angles to the top foil 20 as shown in FIGS. 1 and 2.

The top foil 20 is then heat treated to obtain the desired mechanical properties. An Iconel alloy X-750 top foil is heat treated at 1350° F. for 20 hours and cooled to room temperature. An Inconel alloy 718 top foil is likewise heat treated at 1350° F. for 20 hours which is followed by another heat treat at 1150° F. for 10 hours. The top foil is then cooled to room temperature.

The top foils 20 and the bump foils 22 are assembled in the sleeve 18 as shown in FIGS. 1 and 2. The tabs 24 are inserted into suitable slots 26 in the sleeve 18 for sliding engagement therewith. The tabs 24 are at the end of the bearing pad assembly 16 in the direction of rotation of the shaft 12. The tabs are free to move in the slots in a direction normal to the shaft 12 while being restrained from movement in the direction of shaft rotation parallel to the surface 14.

ALTERNATE EMBODIMENTS OF THE INVENTION

Figure 3:
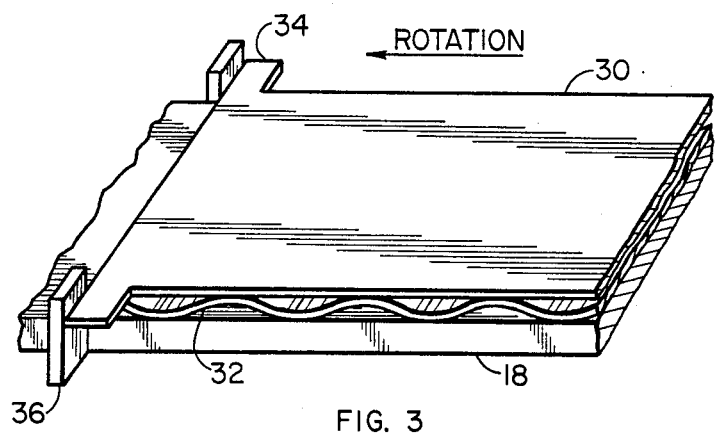
FIG. 3 is a perspective view of an unwrapped air bearing pad assembly illustrating an alternate embodiment of the invention.

Referring to FIG. 3 there is shown an alternate embodiment of the bearing pad assembly of FIGS. 1 and 2. The assembly comprises a top foil 30 and bump foil 32 that have been prepared in the same manner as the top foil 20 and bump foil 22 explained above.

In this embodiment a pair of tabs 34 extend outwardly from the end of the top foil 30 in a direction parallel to the axis of the shaft 12. The tabs 34 engage protrusions in the form of oppositely disposed stops 36 attached to the edges of the cartridge sleeve 18. Here again, the tabs 34 are free to move in a direction normal to the shaft 21, but are restrained from moving in the direction of rotation of the shaft. This embodiment is limited to installations where the shaft 12 rotates only in one direction.

Figure 4:
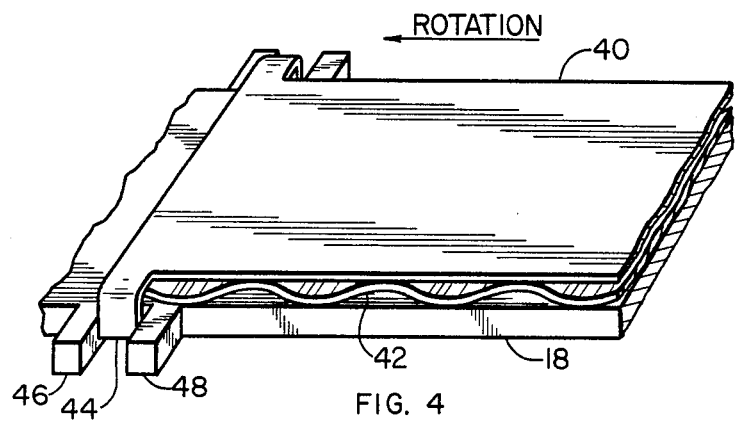
FIG. 4 is a perspective view of an unwrapped air bearing pad assembly illustrating another embodiment of the invention.

In the embodiment shown in FIG. 4 a top foil 40 and bump foil 42 are again prepared in the same manner as the top foil 20 and bump foil 22. In this embodiment a pair of opposed tabs 44 are formed on the top foil 40 in the same manner as the tabs 34 are formed on the top foil 30 in the embodiment of FIG. 3. However, in this embodiment the tabs 44 are bent downwardly toward the cartridge sleeve 18 where they are restrained from movement by suitable outwardly extending blocks 44 and 48. The spacing between the blocks 44 and 48 is slightly greater than the width of the tabs 44.

It will be appreciated that the block 46 functions in the same manner as the block 36 in the embodiment of FIG. 3. The block 48 restrains the bearing pad assembly from movement in a direction opposite to the indicated rotation of the shaft 12. This embodiment is particularly useful where the shaft 12 rotates in both directions.

Figure 5:
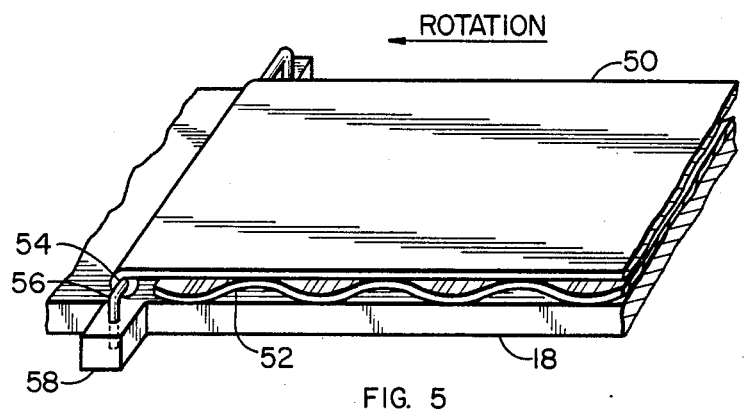
FIG. 5 is a perspective view of an unwrapped air bearing pad assembly illustrating still another embodiment of the invention.

In the embodiment shown in FIG. 5, a top foil 50 and bump foil 52 are again prepared in the same manner as the top foil 20 and the bump foil 22 explained previously. A suitable eye 54 is formed in the end of the top foil 50 for receiving a suitable restraining pin 56 having oppositely disposed end portions that are bent at right angles to the main extent of the pin. These end portions are received in mating holes in outwardly extending blocks 58 on the sleeve 18. The ends of the pins are free to move in these holes in a direction normal to the shaft 12 while restraining the top foil 50 from moving in the direction of rotation of the shaft 12 which may be selectively reversed.

It will be apparent that in all of these embodiments, any rigid attachment which would cause bending of the foil during operation has been eliminated. While several embodiments of the invention have been shown and described, it will be apparent that various structural modifications may be made without departing from the spirit of the invention and the scope of the subjoined claims.

I claim:

1. In a complaint hydrodynamic journal bearing of the type wherein a rotating shaft is supported in a bore extending through a cartridge sleeve, a plurality of pad assemblies having no bump blocks circumferentially spaced around said shaft adjacent to said sleeve, each of said pad assemblies comprising a member having a bearing surface facing said shaft mounted between said shaft and said cartridge sleeve, a compliant element having a plurality of spaced resilient projections for engaging said member to support the same without being secured thereto positioned between said member and said cartridge sleeve, at least one projection on an end of said member in the direction of rotation of said shaft, said projection having one surface facing in said direction of rotation and another surface facing in an opposite direction, and restraining means on said sleeve for engaging at least one of said surfaces whereby movement of said member is restricted to a direction normal to said shaft thereby inhibiting destructive bending moments within said member during rotation of said shaft, said restraining means comprising at least one protrusion extending from an edge of the bore of said cartridge sleeve, and said projection extends outwardly from an end of said member in a direction parallel to said bore and has one surface in engagement with said protrusion.

2. A bearing as claimed in claim 1 wherein the member is a foil having a thickness of about 0.004 inch.

3. A bearing as claimed in claim 1 including at least one other protrusion extending from said edge of said bore and spaced from said one protrusion so that another surface of said projection opposite said one surface engages said other protrusion.

4. In a complaint hydrodynamic journal bearing of the type wherein a rotating shaft is supported in a bore extending through a cartridge sleeve, a plurality of pad assemblies having no bump blocks circumferentially spaced around said shaft adjacent to said sleeve, each of said pad assemblies comprising a member having a bearing surface facing said shaft mounted between said shaft and said cartridge sleeve, a complaint element having a plurality of spaced resilient projections for engaging said member to support the same without being secured thereto positioned between said member and said cartridge sleeve, a pin on an end of said member in the direction of rotation of said shaft, said pin being in engagement with a receiving eye in an end portion of said member, and restraining means on said sleeve for restricting movement of said member to a direction normal to said shaft thereby inhibiting destructive bending moments within said member during rotation of said shaft, said restraining means comprising at least one protrusion extending from an edge of the bore of said cartridge sleeve having an opening therein for receiving a portion of said pin in sliding engagement.

5. A bearing as claimed in claim 4 wherein said member is a foil having a thickness of about 0.004 inch.

6. A compliant hydrodynamic fluid film bearing for dynamically supporting a shaft for rotation about its normal axis comprising a mounting member having a cylindrical bore therein for receiving said shaft, said cylindrical bore being substantially coaxial with said normal axis of said shaft, a plurality of pad assemblies having no bump blocks circumferentially spaced around said shaft within said bore, each of said pad assemblies comprising an elongated metal sheet having a bearing surface facing said shaft, a pair of oppositely disposed tabs extending outwardly from the end of said elongated metal sheet in a direction parallel to the bore of the mounting member, a compliant metal sheet having a plurality of spaced resilient projections for engaging a surface of said elongated sheet opposite said bearing surface to support said elongated sheet without being secured thereto, at least one projection on an end of said elongated metal sheet in the direction of rotation of said shaft, said projection having one surface facing in said direction of rotation and another surface facing in an opposite direction, restraining means on said mounting member for engaging at least one of said surfaces whereby movement of said elongated sheet is restricted to a direction normal to said shaft thereby inhibiting destructive bending moments within said elongated metal sheet during rotation of said shaft, said restraining means comprising a pair of oppositely disposed stops extending outwardly from the mounting member adjacent to said bore, each of said tabs having one surface in engagement with one of said stops.

7. A bearing as claimed in claim 6 including a second pair of stops extending outwardly from said mounting member adjacent said bore and spaced from said first stops at distance slightly greater than the width of each of said tabs so that another surface of each of said tabs opposite said one surface engages said other stop.

8. A compliant hydrodynamic fluid film bearing for dynamically supporting a shaft for rotation about its normal axis comprising a mounting member having a cylindrical bore therein for receiving said shaft, said cylindrical bore being substantially coaxial with said normal axis of said shaft, a plurality of pad assemblies having no bump blocks circumferentially spaced around said shaft within said bore, each of said pad assemblies comprising an elongated metal sheet having a bearing surface facing said shaft, a compliant metal sheet having a plurality of spaced resilient projections for engaging a surface of said elongated sheet opposite said bearing surface to support said elongated sheet without being secured thereto, a pin on an end of said elongated metal sheet in the direction of rotation of said shaft, said pin being in engagement with an eye formed in the end of said elongated metal sheet, said pin having a central portion and oppositely disposed end portions extending at right angles to said central portion, and restraining means on said mounting member for restricting movement of said elongated sheet to a direction normal to said shaft thereby inhibiting destructive bending moments within said elongated metal sheet during rotation of said shaft, said restraining means comprising a pair of opposed blocks extending outward from opposite ends of said mounting member adjacent to said bore, each of said blocks having an opening for receiving an end portion of said pin in sliding engagement therewith.

* * * * *

UNITED STATES PATENT AND TRADEMARK OFFICE
CERTIFICATE OF CORRECTION

PATENT NO. : 4,552,466

DATED : November 12, 1985

INVENTOR(S) : Edward L. Warren

It is certified that error appears in the above-identified patent and that said Letters Patent is hereby corrected as shown below:

Column 1, line 37, cancel "particulary" and insert --particularly--

Column 2, line 9, cancel "complaint" and insert --compliant--

Column 3, line 24, cancel "Iconel" and insert --Inconel--

Column 4, line 27, cancel "complaint" and insert --compliant--
        line 64, cancel "complaint" and insert --compliant--

Column 5, line 6, cancel "complaint" and insert --compliant--

Signed and Sealed this

First Day of July 1986

[SEAL]

Attest:

DONALD J. QUIGG

Attesting Officer

Commissioner of Patents and Trademarks